United States Patent
Kim et al.

(10) Patent No.: US 12,242,172 B2
(45) Date of Patent: Mar. 4, 2025

(54) CAMERA MODULE

(71) Applicant: Samsung Electro-Mechanics Co., Ltd., Suwon-si (KR)

(72) Inventors: Jin Se Kim, Suwon-si (KR); So Mi Yang, Suwon-si (KR); Young Suk Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 17/226,395

(22) Filed: Apr. 9, 2021

(65) Prior Publication Data

US 2022/0082903 A1 Mar. 17, 2022

(30) Foreign Application Priority Data

Sep. 16, 2020 (KR) ........................ 10-2020-0119074

(51) Int. Cl.
*G03B 17/12* (2021.01)
*G02B 7/02* (2021.01)
*H04N 23/55* (2023.01)

(52) U.S. Cl.
CPC ............. *G03B 17/12* (2013.01); *G02B 7/022* (2013.01); *H04N 23/55* (2023.01)

(58) Field of Classification Search
CPC ........ G03B 17/12; G03B 30/00; G02B 7/022; G02B 7/021; G02B 9/64; G02B 13/0045; H04N 5/2254; H04N 5/2257
See application file for complete search history.

(56) References Cited

U.S. PATENT DOCUMENTS

| | | | |
|---|---|---|---|
| 2007/0139939 A1* | 6/2007 | Li | G03B 3/00 362/268 |
| 2008/0100934 A1* | 5/2008 | Webster | G02B 7/023 359/830 |
| 2009/0185291 A1* | 7/2009 | Tsuchiya | G02B 7/025 359/738 |
| 2016/0085046 A1* | 3/2016 | Kim | G02B 7/026 359/830 |
| 2016/0161702 A1 | 6/2016 | Yang | |

(Continued)

FOREIGN PATENT DOCUMENTS

| | | |
|---|---|---|
| CN | 1776474 A | 5/2006 |
| CN | 101025444 A | 8/2007 |

(Continued)

OTHER PUBLICATIONS

Notice of Reasons for Rejection issued on Oct. 19, 2021, in counterpart Korean Patent Application No. 10-2020-0119074 (9 pages in English and 6 pages in Korean).

(Continued)

*Primary Examiner* — Sinh Tran
*Assistant Examiner* — Zhenzhen Wu
(74) *Attorney, Agent, or Firm* — NSIP Law

(57) ABSTRACT

A camera module includes a first lens barrel including a first support portion supporting a lens accommodated in the first lens barrel on an object side of the first lens barrel, and a second lens barrel including a second support portion supporting a lens accommodated in the second lens barrel on an image side of the second lens barrel, wherein the first lens barrel and the second lens barrel are configured to be coupled to each other by a protrusion and a groove.

20 Claims, 10 Drawing Sheets

(56) References Cited

U.S. PATENT DOCUMENTS

| | | | |
|---|---|---|---|
| 2018/0164531 A1 | 6/2018 | Wei | |
| 2020/0049936 A1* | 2/2020 | Wei | G02B 7/006 |
| 2020/0064527 A1* | 2/2020 | Shigemitsu | G02B 13/007 |
| 2020/0209506 A1* | 7/2020 | Liu | H04N 23/57 |
| 2020/0409025 A1* | 12/2020 | Wei | G02B 7/021 |
| 2021/0141291 A1* | 5/2021 | Hirata | G02B 7/021 |
| 2021/0302805 A1* | 9/2021 | Yoshida | G02B 7/025 |
| 2022/0146778 A1* | 5/2022 | Fujii | G02B 7/021 |

FOREIGN PATENT DOCUMENTS

| | | | |
|---|---|---|---|
| CN | 105676401 A | 6/2016 | |
| CN | 106154478 A | 11/2016 | |
| CN | 108627939 A | 10/2018 | |
| CN | 210348027 U | 4/2020 | |
| EP | 3 605 177 A1 | 2/2020 | |
| JP | 11-231195 A | 8/1999 | |
| KR | 100843475 B1 * | 7/2008 | |
| KR | 10-2009-0051901 A | 5/2009 | |
| KR | 10-2018-0059070 A | 6/2018 | |
| KR | 10-2019-0131042 A | 11/2019 | |
| WO | WO-2018171656 A1 * | 9/2018 | G02B 13/001 |

OTHER PUBLICATIONS

Taiwanese Office Action issued on Jan. 18, 2022, in counterpart Taiwanese Patent Application No. 110114685 (8 pages in English and 10 pages in Mandarin).

Chinese Office Action issued on Apr. 1, 2024, in counterpart Chinese Patent Application No. 202110884473.2 (7 pages in English, 11 pages in Chinese).

* cited by examiner

CAMERA MODULE

CROSS-REFERENCE TO RELATED APPLICATIONS

This application claims the benefit under 35 USC 119(a) of Korean Patent Application No. 10-2020-0119074 filed on Sep. 16, 2020, in the Korean Intellectual Property Office, the entire disclosure of which is incorporated herein by reference for all purposes.

BACKGROUND

1. Field

The present disclosure relates to a camera module in which separation of a lens from a lens barrel may be prevented.

2. Description of the Background

A camera module includes a lens barrel configured to accommodate a plurality of lenses therein. The lens barrel has an internal space in which the lenses may be sequentially arranged in ascending order of size. For example, the internal space of the lens barrel may become gradually wider from one side thereof toward the other side thereof to sequentially accommodate a first lens having the smallest size and a lens having the largest size therein. Since the other side of the lens barrel is wide enough to accommodate the largest lens, the lenses may be easily separated from the lens barrel. Therefore, in order to prevent the separation of the lenses, an outermost lens is fixed by inserting a press-fitting ring into the other side of the lens barrel or applying an adhesive to the other side of the lens barrel. However, as the number of lenses arranged in the lens barrel gradually increases, it becomes difficult to fix the lens through the press-fit ring and the adhesive.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a camera module includes a first lens barrel including a first support portion supporting a lens accommodated in the first lens barrel on an object side of the first lens barrel, and a second lens barrel including a second support portion supporting a lens accommodated in the second lens barrel on an image side of the second lens barrel, wherein the first lens barrel and the second lens barrel are configured to be coupled to each other by a protrusion and a groove.

The camera module may further include a first lens group disposed in the first lens barrel, and a second lens group disposed in the second lens barrel.

The first lens group may include a plurality of lenses.

A maximum diameter of a lens constituting the first lens group may be smaller than that of a lens constituting the second lens group.

The first lens barrel may include a step portion for supporting a lens of the first lens group in a first accommodation space of the first lens barrel.

The camera module may further include a gap maintaining member disposed between a first lens accommodated in the first lens barrel and a second lens accommodated in the second lens barrel when the first lens barrel and the second lens barrel are coupled to each other by the protrusion and the groove.

A maximum diameter of the gap maintaining member may be larger than that of the second lens.

A space in which an adhesive is to be filled may be located between the protrusion and the groove when the first lens barrel and the second lens barrel are coupled to each other by the protrusion and the groove.

The protrusion and the groove may include screw threads to mate to each other.

An electronic device may include the camera module further including an image sensor configured to convert an optical signal incident through the lenses of the first and second lens barrels into an electric signal when the first lens barrel and the second lens barrel are coupled to each other by the protrusion and the groove, and a surface installed with the camera module.

In another general aspect, a camera module includes a first lens barrel including a first support portion supporting a lens accommodated in the first lens barrel on an object side of the first lens barrel, and a second lens barrel including a second support portion supporting a lens accommodated in the second lens barrel on an image side of the second lens barrel, wherein the first lens barrel is configured to be fitted into the second lens barrel, and a maximum diameter of the first lens barrel is smaller than that of the second lens barrel.

The camera module may further include a gap maintaining member disposed between a first lens accommodated in the first lens barrel and a second lens accommodated in the second lens barrel when the first lens barrel is fitted into the second lens barrel.

An inner peripheral surface of the gap maintaining member may include an inclination.

The second support portion may be disposed at an interval along an inner peripheral surface of the second lens barrel.

A space in which an adhesive is applied may be located between an outer peripheral surface of the first lens barrel and an inner peripheral surface of the second lens barrel when the first lens barrel is fitted into the second lens barrel.

An electronic device may include the camera module further including an image sensor configured to convert an optical signal incident through the lenses of the first and second lens barrels into an electric signal when the first lens barrel is fitted into the second lens barrel, and a surface installed with the camera module.

In another general aspect, a camera module includes a first lens barrel having a support portion disposed on an object side of the first lens barrel supporting a first lens accommodated in the first lens barrel, a second lens barrel having a support portion disposed on an image side of the second lens barrel supporting a second lens accommodated in the second lens barrel, a coupling component coupling the first lens barrel to the second lens barrel, and an image sensor configured to convert an optical signal incident through the first and second lenses into an electric signal.

An electronic device may include the camera module and a surface installed with the camera module, wherein the coupling component comprises a protrusion on an object side of the second lens barrel coupling with a groove or an outer diameter of the image side of the first lens barrel.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
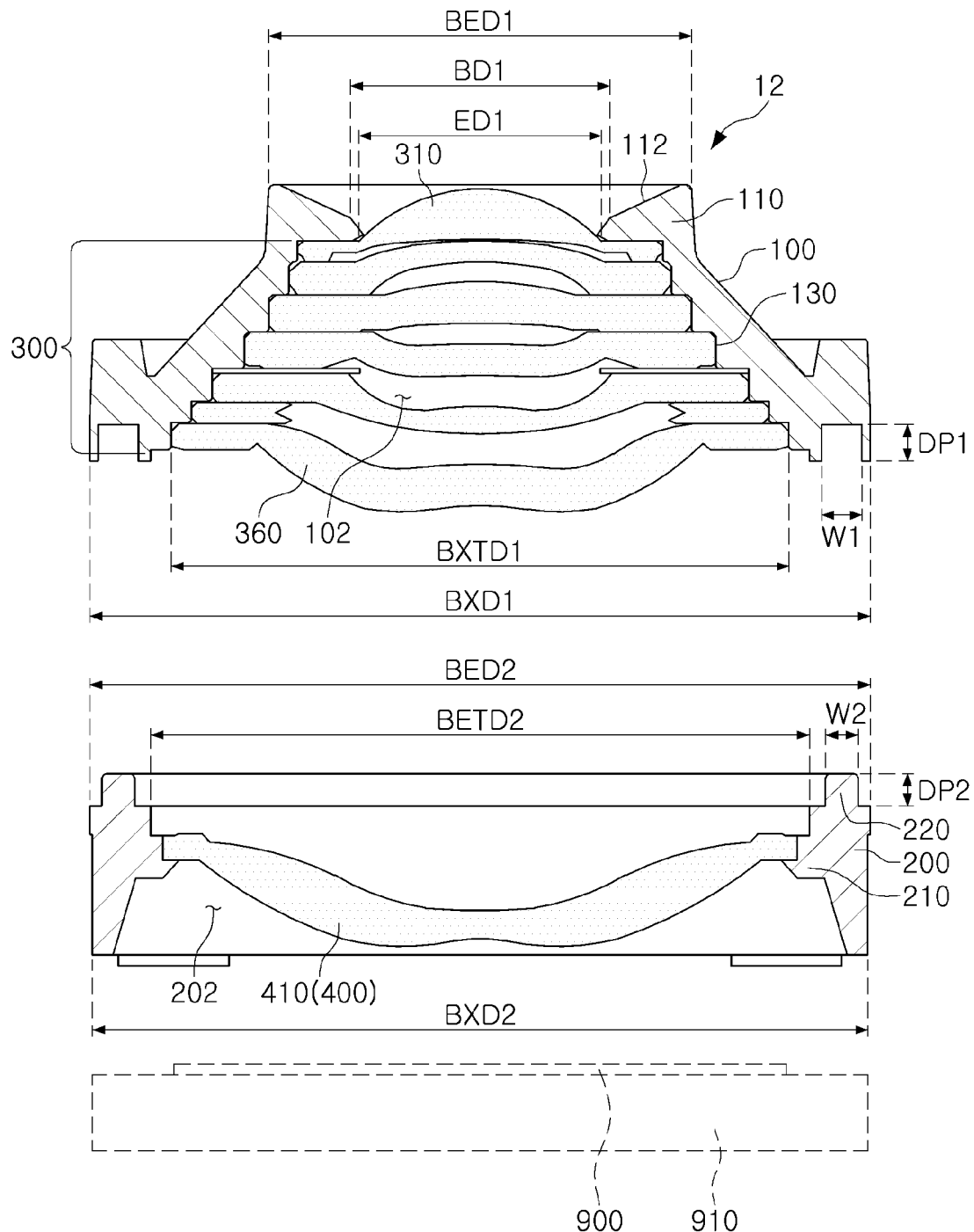
FIG. 1 is an exploded cross-sectional view of a camera module according to an example embodiment.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or a part of the whole element less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

A camera module described in the present specification may be mounted in a mobile electronic product. For example, the camera module may be mounted in a mobile phone, a laptop computer or the like. However, a use range of the camera module according to the example embodiments is not limited to the electronic product described above. For example, the camera module may be mounted in any electronic device whose front and/or rear surfaces may be installed with the camera module.

An aspect of the present disclosure provides a camera module including a lens barrel configured to be capable of preventing a phenomenon in which a lens is separated from the lens barrel.

Figure 2:
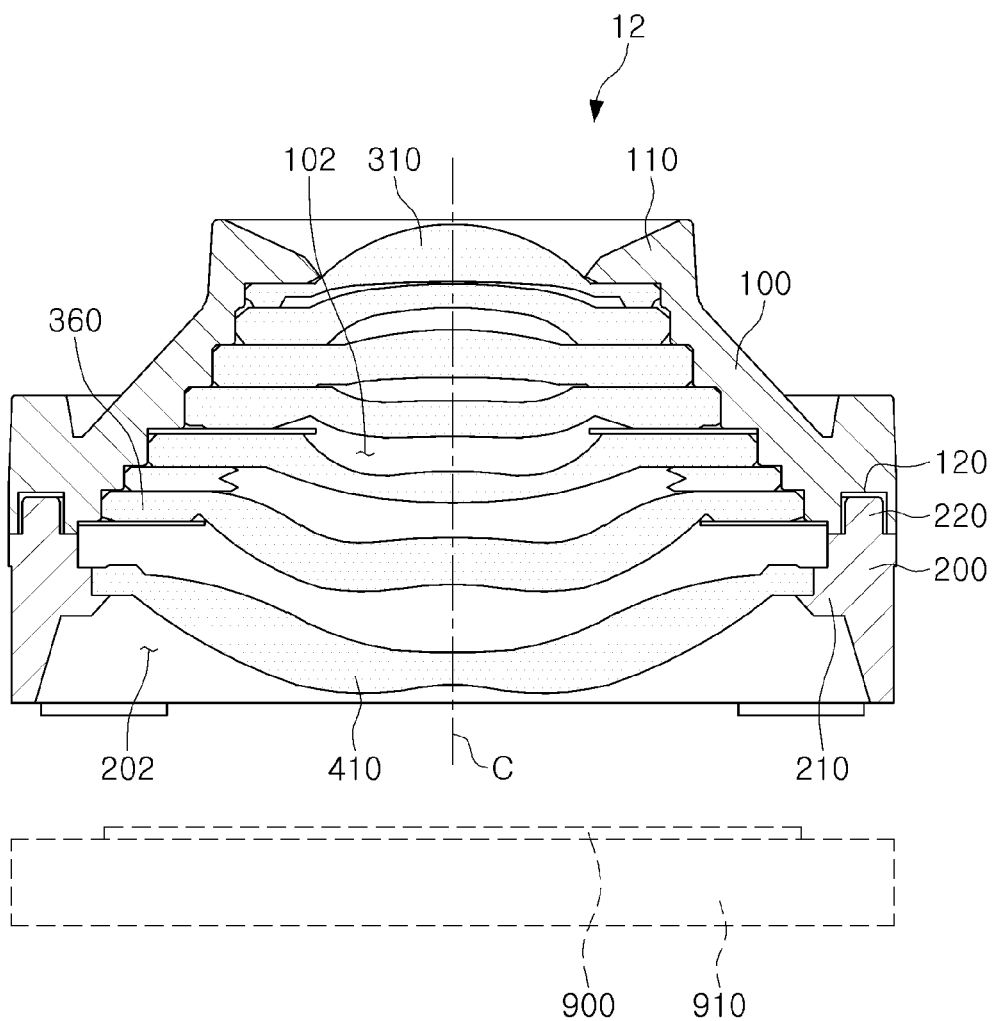
FIG. 2 is an assembled cross-sectional view of the camera module illustrated in FIG. 1.

A camera module according to an example embodiment of the present disclosure will be described with reference to FIGS. 1 and 2.

The camera module 12 according to the present embodiment may include a first lens barrel 100 and a second lens barrel 200. However, components of the camera module 12 are not limited to the first lens barrel 100 and the second lens barrel 200. For example, the camera module 12 may further include a driving unit driving the lens barrels 100 and 200 in an optical axis direction or in a direction intersecting with the optical axis direction, an image sensor 900 converting an optical signal into an electric signal, a substrate 910 on which the image sensor 900 is mounted, and the like.

The first lens barrel 100 may have a substantially truncated conical shape. However, a shape of the first lens barrel 100 is not limited to the truncated conical shape. For example, the first lens barrel 100 may have another shape within a range in which the first lens barrel 100 may accommodate one or more lenses therein. The first lens barrel 100 may have a shape whose one end and the other end have different sizes. For example, an outer diameter BED1 of the one end (object side) of the first lens barrel 100 may be smaller than an outer diameter BXD1 of the other end (image side, image sensor side) of the first lens barrel 100. In addition, the outer diameter BED1 of the one end of the first lens barrel 100 may be smaller than an inner diameter BXTD1 of the other end of the first lens barrel 100.

The first lens barrel 100 may be configured to accommodate one or more lens groups constituting an optical system of the camera module 12 therein. For example, the first lens barrel 100 may accommodate a first lens group 300 therein. The first lens group 300 may be disposed closer to the object side than the other lens group. For example, the first lens group 300 may include a first lens disposed closest to the object side. The first lens group 300 may include a plurality of lenses. For example, the first lens group 300 may include five or more lenses. However, the number of lenses constituting the first lens group 300 is not limited to five. For example, the first lens group 300 may also include six or more lenses.

The first lens barrel 100 may be configured to accommodate the plurality of lenses therein. For example, an internal space 102 of the first lens barrel 100 may be formed to be elongated in an optical axis (C) direction. The first lens barrel 100 may align positions of the lenses accommodated in the internal space 102 with each other. For example, step portions 130 for aligning the lenses accommodated in the internal space 102 with each other may be formed in the internal space 102 of the first lens barrel 100. The step portions 130 may be formed according to sizes and the number of lenses accommodated in the first lens barrel 100. For example, when the first lens group 300 accommodated in the first lens barrel 100 includes six lenses, six step portions 130 may be formed in the internal space 102. However, the number of step portions 130 formed in the internal space 102 is not limited to the number of lenses accommodated in the first lens barrel 100. For example, the step portions 130 of the internal space 102 may be formed by the sum of the numbers of lenses and gap maintaining members accommodated in the first lens barrel 100. In detail, when five lenses and two gap maintaining members are accommodated in the first lens barrel 100, seven step portions 130 may be formed in the internal space 102.

The step portion 130 may become wider from the one side of the first lens barrel 100 toward the other side thereof. For example, the step portion 130 may become wider from the one side (object side) of the first lens barrel 100 toward the other side (image side, image sensor side) thereof.

The first lens barrel 100 may include a component for preventing separation of the lenses. For example, the first lens barrel 100 may include a first support portion 110 for preventing the lenses accommodated in the first lens barrel 100 from being separated toward the one side (object side) of the first lens barrel 100. The first support portion 110 may be configured to be in contact with a lens 310 located at the forwardmost position of the first lens group 300. For example, the first support portion 110 may have a shape of a stepped jaw or a protrusion in contact with a flange portion of the lens 310. The first support portion 110 may be formed at a front end (object side) of the first lens barrel 100. In detail, all the lenses accommodated in the first lens barrel 100 may be sequentially arranged behind (on the image side of) the first support portion 110. The first support portion 110 may be configured to prevent separation of the forwardmost (first) lens 310 described above. For example, the first support portion 110 may contact the flange portion of the first lens 310 to prevent separation of the first lens 310. The first support portion 110 may be configured to align a position of the forwardmost lens 310 described above. For example, the first support portion 110 may be in contact with an edge of the forwardmost lens 310 to align the position of the first lens 310.

The first support portion 110 may form an opening for enabling incidence of light. A size BD1 of the opening formed by the first support portion 110 may be substantially the same as an effective diameter ED1 of the forwardmost lens (the lens closest to the object side) of the first lens group 300. The first support portion 110 may implement a wide angle of view of the camera module 12. For example, one surface 112 of the first support portion 110 may be inclined to facilitate the incidence of the light.

The first lens barrel 100 may include a component for coupling the first lens barrel 100 to the second lens barrel 200. For example, a groove 120 may be formed in the other end of the first lens barrel 100. The groove 120 may be formed continuously or discontinuously in a circumferential direction of the first lens barrel 100. For example, the groove 120 may be formed in a circular shape around an optical axis C or may be formed at a predetermined interval around the optical axis C. The groove 120 may be formed to have a predetermined size. For example, a width W1 and a depth DP1 of the groove 120 may be substantially the same, respectively, as a thickness W2 and a height DP2 of a protrusion 220 fitted into the groove 120.

The second lens barrel 200 may have a substantially cylindrical shape. However, a shape of the second lens barrel 200 is not limited to the cylindrical shape. For example, the second lens barrel 200 may have another shape within a range in which the second lens barrel 200 may accommodate one or more lenses therein. The second lens barrel 200 may have a shape whose one end and other end have substantially the same size. For example, an outer diameter BED2 of the one end (object side) of the second lens barrel 200 may be substantially the same as an outer diameter BXD2 of the other end (image side, image sensor side) of the second lens barrel 200. The second lens barrel 200 may be configured to accommodate a lens larger than the lens accommodated in the first lens barrel 100 therein. For example, a maximum inner diameter or an inner diameter BETD2 of one end of the second lens barrel 200 may be larger than the inner diameter BXTD1 of the other end of the first lens barrel 100.

The second lens barrel 200 may be configured to accommodate other of the lens groups constituting the optical system of the camera module 12 therein. For example, the second lens barrel 200 may accommodate a second lens group 400 therein. The second lens group 400 may be disposed closer to the image side than the first lens group 300. For example, the second lens group 400 may include a lens disposed closest to the image side. The second lens group 400 may include one or more lenses. For example, the second lens group 400 may include one lens. However, the number of lenses constituting the second lens group 400 is not limited to one. For example, the second lens group 400 may also include two or more lenses. The second lens group 400 may include lenses substantially larger than those of the first lens group 300. For example, a maximum diameter of the lens constituting the second lens group 400 may be larger than a maximum diameter of the lens constituting the first lens group 300.

The second lens barrel 200 may include a component for preventing separation of the lens. For example, the second lens barrel 200 may include a second support portion 210 for preventing the lens accommodated in the second lens barrel 200 from being separated toward one side (image side) of the second lens barrel 200. The second support portion 210 may protrude toward an internal space 202 of the second lens barrel 200. The second support portion 210 may be formed at a rear end (image side) of the second lens barrel 200. In detail, all the lenses accommodated in the second lens barrel 200 may be sequentially arranged in front of (on the object side of) the second support portion 210. The second support portion 210 may be in contact with a rearmost lens 410 of the second lens group 400. For example, the second support portion 210 may be in contact with a flange portion of the rearmost lens 410 to prevent the rearmost lens 410 from being separated toward the image side and align a position of the rearmost lens 410. For example, the second support portion 210 may be in contact with an edge of the rearmost lens 410 to align the position of the rearmost lens 410. The second support portion 210 may be configured to prevent a flare phenomenon. For example, an inner peripheral surface of the second support portion 210 may form a predetermined angle with respect to the optical axis C to alleviate the flare phenomenon that may be caused by the rearmost lens 410.

The second lens barrel 200 may include a component for coupling the second lens barrel 200 to the first lens barrel 100. For example, the protrusion 220 may be formed at one end of the second lens barrel 200. The protrusion 220 may be formed continuously or discontinuously in a circumferential direction of the second lens barrel 200. For example, the protrusion 220 may be formed in a circular shape around the optical axis C or may be formed at a predetermined interval around the optical axis C. The protrusion 220 may be formed to have a predetermined size. For example, the thickness W2 and the height DP2 of the protrusion 220 may be substantially the same as the width W1 and the depth DP1 of the groove 120, respectively.

The first lens barrel 100 and the second lens barrel 200 may be firmly coupled to each other by the protrusion 220 fitted into the groove 120. Therefore, the first lens barrel 100 and the second lens barrel 200 may not be separated from each other by an external impact. An adhesive may be applied to a surface of the groove 120 and/or the protrusion 220 in order to more firmly couple the first lens barrel 100 and the second lens barrel 200 to each other.

In the camera module 12 including the components as described above, a phenomenon in which the lenses are separated due to an external impact may be prevented. For example, in the camera module 12, a phenomenon in which one or more lenses are separated toward the object side or the image side may be suppressed through the first support portion 110 of the first lens barrel 100 and the second support portion 210 of the second lens barrel 200. In addition, in the camera module 12, phenomena such as lifting, shaking, and rattling of the lenses accommodated in the first lens barrel 100 and the second lens barrel 200 may be suppressed through strong coupling between the first lens barrel 100 and the second lens barrel 200. Therefore, the camera module 12 according to the present example embodiment may improve image capturing quality through the optical system accommodated in the lens barrels 100 and 200.

Next, other example embodiments in the present disclosure will be described.

Figure 3:
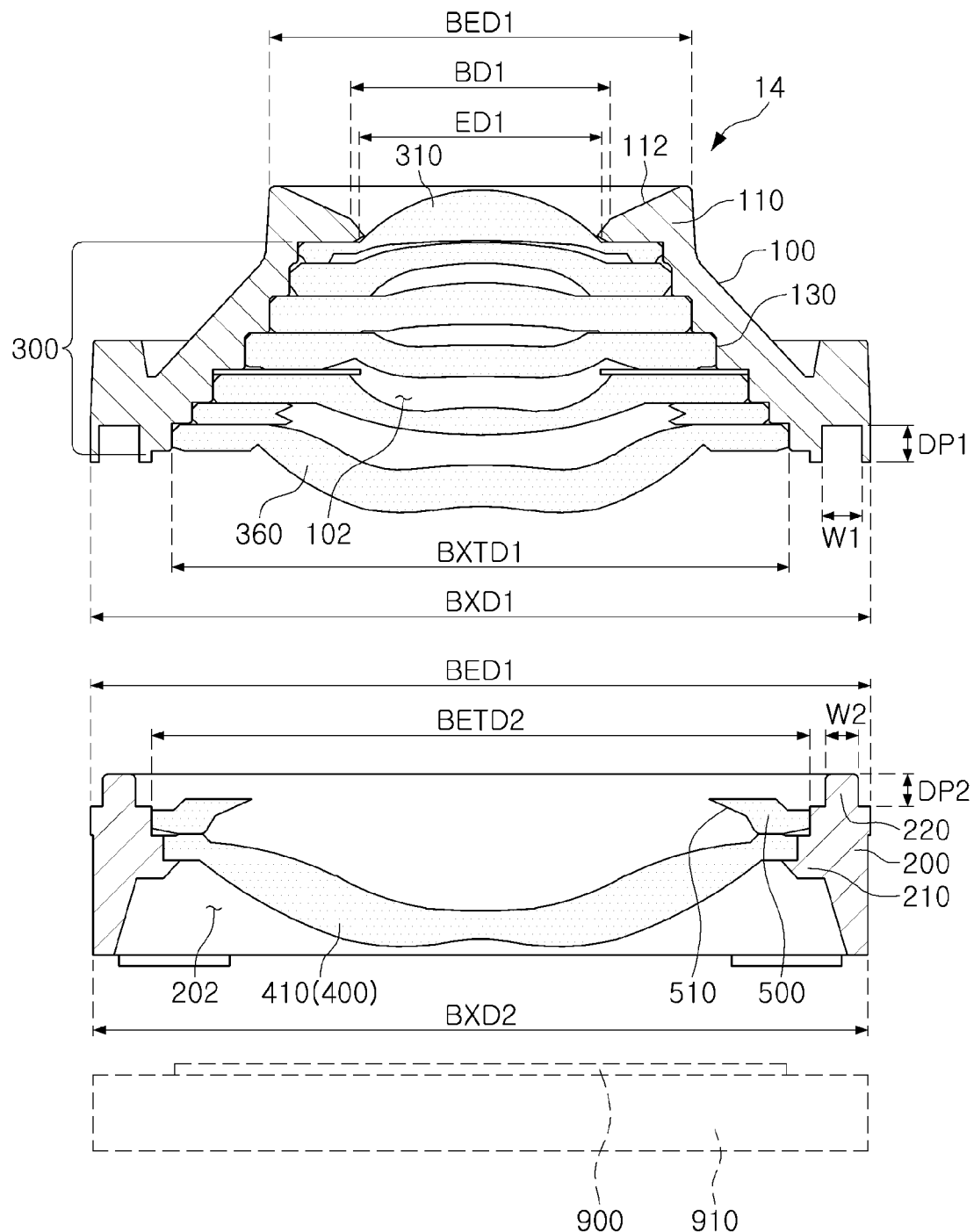
FIG. 3 is an exploded cross-sectional view of a camera module according to another example embodiment.
Figure 4:
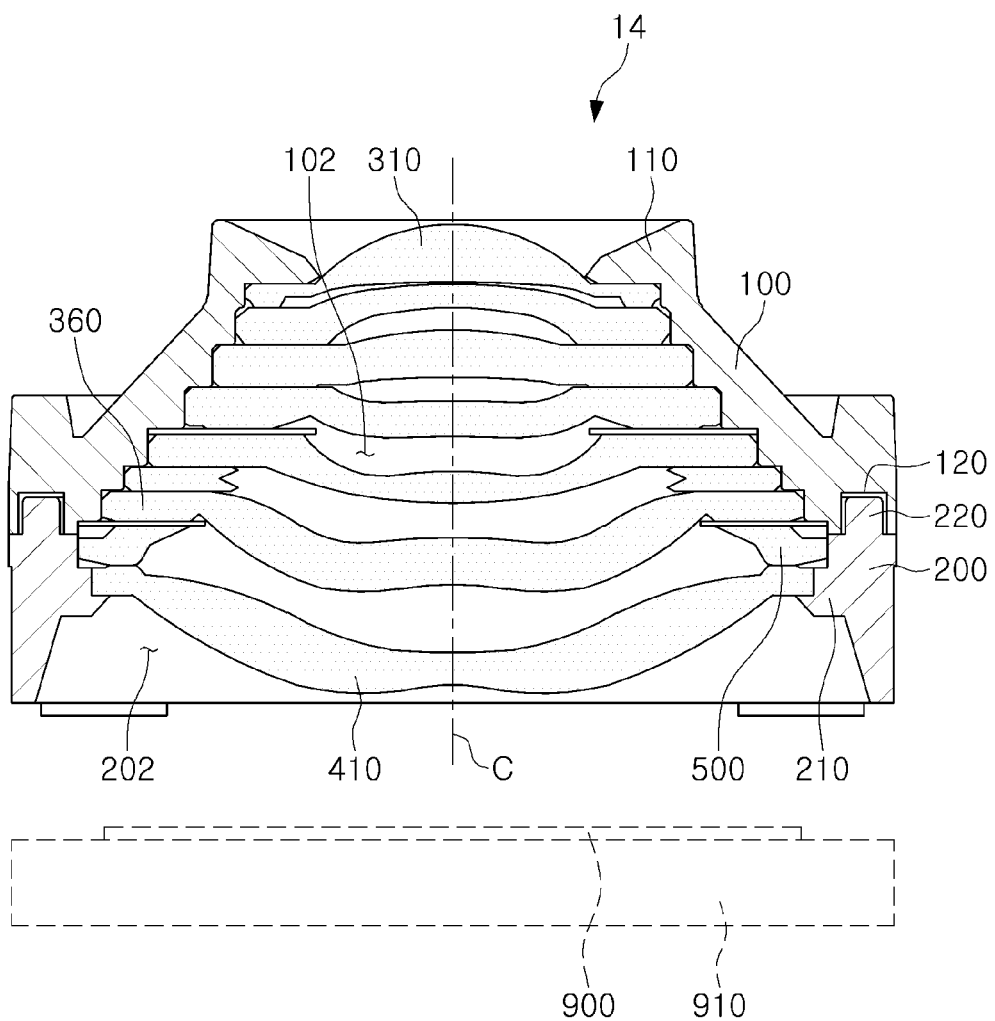
FIG. 4 is an assembled cross-sectional view of the camera module illustrated in FIG. 3.

A camera module according to another example embodiment of the present disclosure will be described with reference to FIGS. 3 and 4.

The camera module 14 according to the present embodiment may include a first lens barrel 100, a second lens barrel 200, and a gap maintaining member 500. However, components of the camera module 14 are not limited to the first lens barrel 100, the second lens barrel 200, and the gap maintaining member 500. For example, the camera module 14 may further include a driving unit driving the lens barrels 100 and 200 in an optical axis direction or in a direction intersecting with the optical axis direction, an image sensor 900 converting an optical signal into an electric signal, a substrate 910 on which the image sensor 900 is mounted, and the like.

The first lens barrel 100 may have a substantially truncated conical shape. However, a shape of the first lens barrel 100 is not limited to the truncated conical shape. For example, the first lens barrel 100 may have another shape within a range in which the first lens barrel 100 may accommodate one or more lenses therein. The first lens barrel 100 may have a shape whose one end and the other end have different sizes. For example, an outer diameter BED1 of the one end (object side) of the first lens barrel 100 may be smaller than an outer diameter BXD1 of the other end (image side, image sensor side) of the first lens barrel 100. In addition, the outer diameter BED1 of the one end of the first lens barrel 100 may be smaller than an inner diameter BXTD1 of the other end of the first lens barrel 100.

The first lens barrel 100 may be configured to accommodate one or more lens groups constituting an optical system of the camera module 14 therein. For example, the first lens barrel 100 may accommodate a first lens group 300 therein. The first lens group 300 may be disposed closer to the object side than the other lens group. For example, the first lens group 300 may include a first lens disposed closest to the object side. The first lens group 300 may include a plurality of lenses. For example, the first lens group 300 may include five or more lenses. However, the number of lenses constituting the first lens group 300 is not limited to five. For example, the first lens group 300 may also include six or more lenses.

The first lens barrel 100 may be configured to accommodate the plurality of lenses therein. For example, an internal space 102 of the first lens barrel 100 may be formed to be elongated in an optical axis (C) direction. The first lens barrel 100 may align positions of the lenses accommodated in the internal space 102 with each other. For example, step portions 130 for aligning the lenses accommodated in the internal space 102 with each other may be formed in the internal space 102 of the first lens barrel 100. The step portions 130 may be formed according to sizes and the number of lenses accommodated in the first lens barrel 100. For example, when the first lens group 300 accommodated in the first lens barrel 100 includes six lenses, six step portions 130 may be formed in the internal space 102. However, the number of step portions 130 formed in the internal space 102 is not limited to the number of lenses accommodated in the first lens barrel 100. For example, the step portions 130 of the internal space 102 may be formed by the sum of the numbers of lenses and gap maintaining members accommodated in the first lens barrel 100. In detail, when five lenses and two gap maintaining members are accommodated in the first lens barrel 100, seven step portions 130 may be formed in the internal space 102.

The step portion 130 may become wider from the one side of the first lens barrel 100 toward the other side thereof. For example, the step portion 130 may become wider from the one side (object side) of the first lens barrel 100 toward the other side (image side, image sensor side) thereof.

The first lens barrel 100 may include a component for preventing separation of the lenses. For example, the first lens barrel 100 may include a first support portion 110 for preventing the lenses accommodated in the first lens barrel 100 from being separated toward the one side (object side) of the first lens barrel 100. The first support portion 110 may be configured to be in contact with a lens 310 located at the forwardmost position of the first lens group 300. For example, the first support portion 110 may have a shape of a stepped jaw or a protrusion in contact with a flange portion of the lens 310. The first support portion 110 may be formed at a front end (object side) of the first lens barrel 100. In detail, all the lenses accommodated in the first lens barrel 100 may be sequentially arranged behind (on the image side of) the first support portion 110. The first support portion 110 may be configured to prevent separation of the forwardmost (first) lens 310 described above. For example, the first support portion 110 may contact the flange portion of the first lens 310 to prevent separation of the first lens 310. The first support portion 110 may be configured to align a position of the forwardmost lens 310 described above. For example, the first support portion 110 may be in contact with an edge of the forwardmost lens 310 to align the position of the first lens 310.

The first support portion 110 may form an opening for enabling incidence of light. A size BD1 of the opening formed by the first support portion 110 may be substantially the same as an effective diameter ED1 of the forwardmost lens (the lens closest to the object side) of the first lens group 300. The first support portion 110 may implement a wide angle of view of the camera module 14. For example, one surface 112 of the first support portion 110 may be inclined to facilitate the incidence of the light.

The first lens barrel 100 may include a component for coupling the first lens barrel 100 to the second lens barrel 200. For example, a groove 120 may be formed at the other end of the first lens barrel 100. The groove 120 may be formed continuously or discontinuously in a circumferential direction of the first lens barrel 100. For example, the groove 120 may be formed in a circular shape around an optical axis C or may be formed at a predetermined interval around the optical axis C. The groove 120 may be formed to have a predetermined size. For example, a width W1 and a depth DP1 of the groove 120 may be substantially the same, respectively, as a thickness W2 and a height DP2 of a protrusion 220 fitted into the groove 120.

The second lens barrel 200 may have a substantially cylindrical shape. However, a shape of the second lens barrel 200 is not limited to the cylindrical shape. For example, the second lens barrel 200 may have another shape within a range in which the second lens barrel 200 may accommodate one or more lenses therein. The second lens barrel 200 may have a shape whose one end and other end have substantially the same size. For example, an outer diameter BED2 of the one end (object side) of the second lens barrel 200 may be substantially the same as an outer diameter BXD2 of the other end (image side, image sensor side) of the second lens barrel 200. The second lens barrel 200 may be configured to accommodate a lens larger than the lens accommodated in the first lens barrel 100 therein. For example, a maximum inner diameter or an inner diameter BETD2 of one end of the second lens barrel 200 may be larger than the inner diameter BXTD1 of the other end of the first lens barrel 100.

The second lens barrel 200 may be configured to accommodate other of the lens groups constituting the optical system of the camera module 14 therein. For example, the second lens barrel 200 may accommodate a second lens group 400 therein. The second lens group 400 may be disposed closer to the image side than the first lens group 300. For example, the second lens group 400 may include a lens disposed closest to the image side. The second lens group 400 may include one or more lenses. For example, the second lens group 400 may include one lens. However, the number of lenses constituting the second lens group 400 is not limited to one. For example, the second lens group 400 may also include two or more lenses. The second lens group 400 may include lenses substantially larger than those of the first lens group 300. For example, a maximum diameter of the lens constituting the second lens group 400 may be larger than a maximum diameter of the lens constituting the first lens group 300.

The second lens barrel 200 may include a component for preventing separation of the lens. For example, the second lens barrel 200 may include a second support portion 210 for preventing the lens accommodated in the second lens barrel 200 from being separated toward one side (image side) of the second lens barrel 200. The second support portion 210 may protrude toward an internal space 202 of the second lens barrel 200. The second support portion 210 may be formed at a rear end (image side) of the second lens barrel 200. In detail, all the lenses accommodated in the second lens barrel 200 may be sequentially arranged in front of (on the object side of) the second support portion 210. The second support portion 210 may be in contact with a rearmost lens 410 of the second lens group 400. For example, the second support portion 210 may be in contact with a flange portion of the rearmost lens 410 to prevent the rearmost lens 410 from being separated toward the image side and align a position of the rearmost lens 410. The second support portion 210 may be configured to prevent a flare phenomenon. For example, an inner peripheral surface of the second support portion 210 may form a predetermined angle with respect to the optical axis C to alleviate the flare phenomenon that may be caused by the rearmost lens 410.

The second lens barrel 200 may include a component for coupling the second lens barrel 200 to the first lens barrel 100. For example, the protrusion 220 may be formed at one end of the second lens barrel 200. The protrusion 220 may be formed continuously or discontinuously in a circumferential direction of the second lens barrel 200. For example, the protrusion 220 may be formed in a circular shape around the optical axis C or may be formed at a predetermined interval around the optical axis C. The protrusion 220 may be formed to have a predetermined size. For example, the thickness W2 and the height DP2 of the protrusion 220 may be substantially the same as the width W1 and the depth DP1 of the groove 120, respectively.

The gap maintaining member 500 may be disposed between the first lens barrel 100 and the second lens barrel 200. For example, the gap maintaining member 500 may be disposed between a lens 360 disposed at the rearmost position of the first lens barrel 100 and the lens 410 disposed at the forwardmost position of the second lens barrel 200. The gap maintaining member 500 may serve to maintain a gap between the lenses at a size according to an optical design. For example, a gap between the lens 360 and the lens 410 may be adjusted by changing a thickness of the gap maintaining member 500. The gap maintaining member 500 may be formed to have a predetermined size. For example, a maximum diameter of the gap maintaining member 500 may be larger than a maximum diameter of the lens 410 disposed at the forwardmost position of the second lens barrel 200. However, the maximum diameter of the gap maintaining member 500 is not necessarily larger than the maximum diameter of the lens 410. For example, the maximum diameter of the gap maintaining member 500 may be smaller than the maximum diameter of the lens 410.

The gap maintaining member 500 may serve to alleviate a flare phenomenon. For example, an inner peripheral surface 510 of the gap maintaining member 500 may form a predetermined angle with respect to the optical axis C to alleviate the flare phenomenon that may be caused between the lens 360 and the lens 410. The gap maintaining member 500 may be configured to align optical axes of the lens 360 and the lens 410 with each other. For example, the gap maintaining member 500 and the lenses 360 and 410 may be configured to engage with each other through a protrusion, a groove, or other coupling structures, so that relative positions of the gap maintaining member 500 and the lenses 360 and 410 may be aligned with each other through a coupling contact.

The first lens barrel 100 and the second lens barrel 200 may be firmly coupled to each other by the protrusion 220 fitted into the groove 120. Therefore, the first lens barrel 100 and the second lens barrel 200 may not be separated from each other by an external impact. An adhesive may be applied to a surface of the groove 120 and/or the protrusion 220 in order to more firmly couple the first lens barrel 100 and the second lens barrel 200 to each other.

In the camera module 14 including the components as described above, a phenomenon in which the lenses are separated due to an external impact may be prevented. For example, in the camera module 14, a phenomenon in which one or more lenses are separated toward the object side or the image side may be suppressed through the first support portion 110 of the first lens barrel 100 and the second support portion 210 of the second lens barrel 200. In addition, in the camera module 14, phenomena such as lifting, shaking, and rattling of the lenses accommodated in the first lens barrel 100 and the second lens barrel 200 may be suppressed through strong coupling between the first lens barrel 100 and the second lens barrel 200. Therefore, the camera module 14 according to the present example embodiment may improve image capturing quality through the optical system accommodated in the lens barrels 100 and 200.

In addition, in the camera module 14 according to the present embodiment, the lenses may be in close contact with each other and the optical axes of the lenses may be aligned with each other, through the gap maintaining member 500. Therefore, a defective rate that may be caused in an assembly process of the camera module 14 may be lowered.

Figure 5:
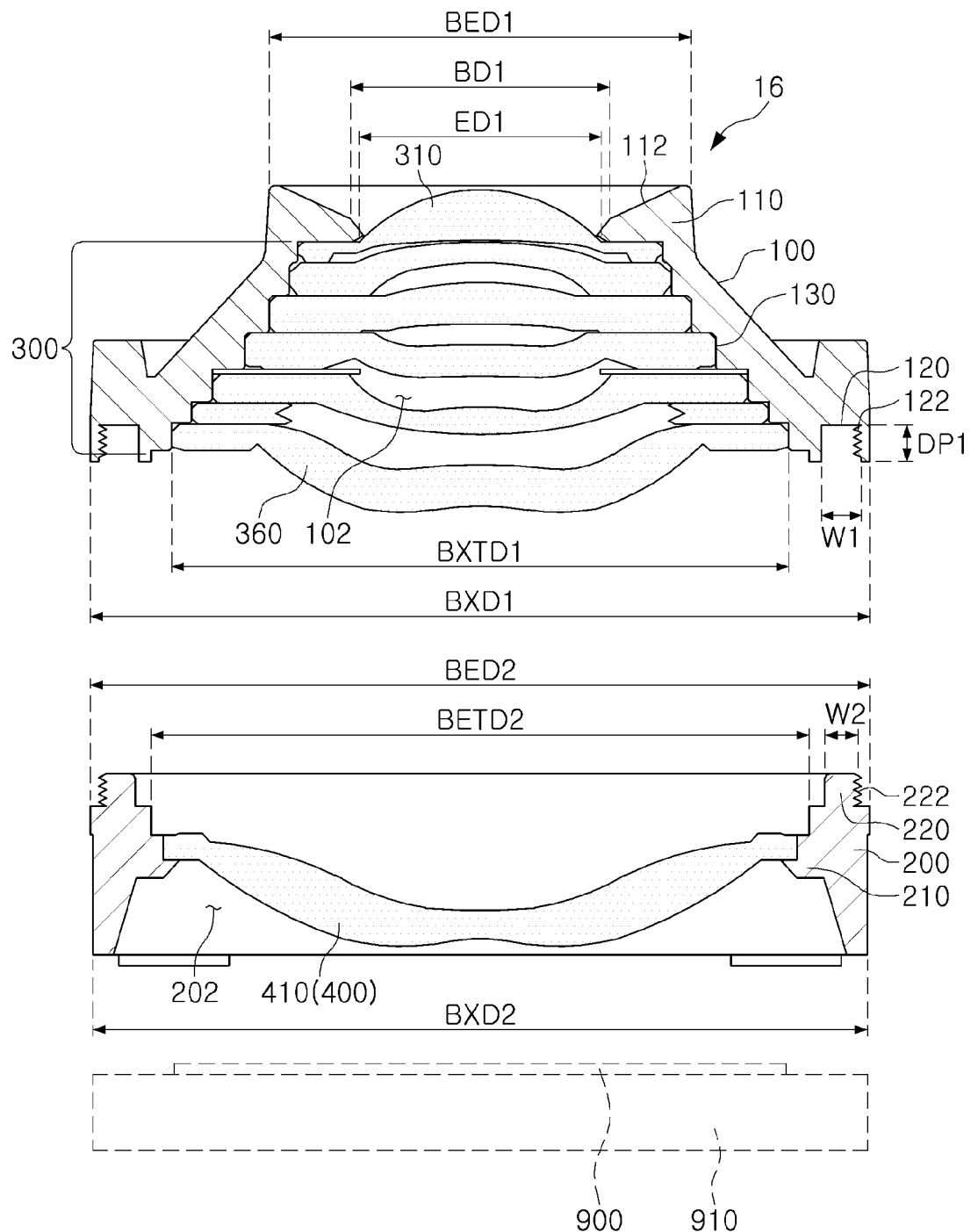
FIG. 5 is an exploded cross-sectional view of a camera module according to another example embodiment.
Figure 6:
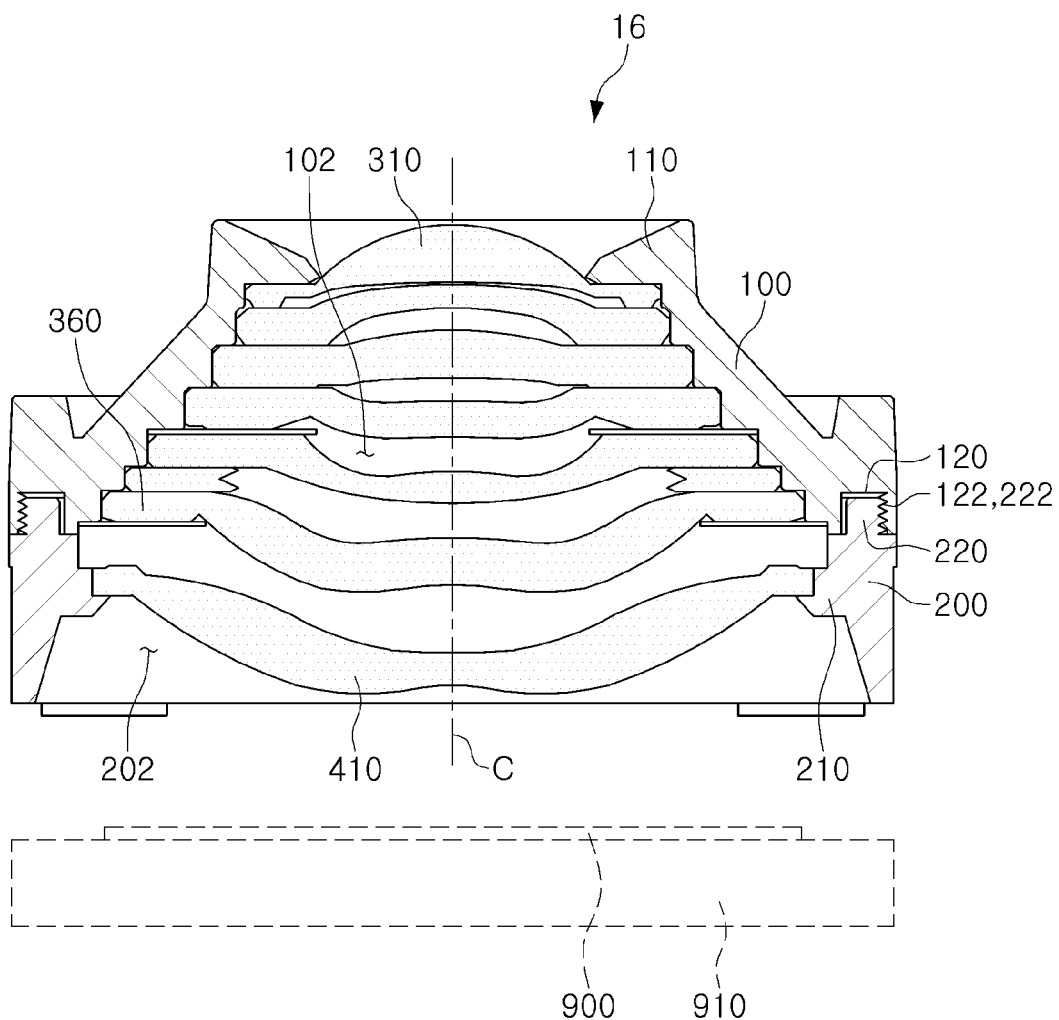
FIG. 6 is an assembled cross-sectional view of the camera module illustrated in FIG. 5.

A camera module according to another example embodiment of the present disclosure will be described with reference to FIGS. 5 and 6.

The camera module 16 according to the present embodiment may include a first lens barrel 100 and a second lens barrel 200. However, components of the camera module 16 are not limited to the first lens barrel 100 and the second lens barrel 200. For example, the camera module 16 may further include a driving unit driving the lens barrels 100 and 200 in an optical axis direction or in a direction intersecting with the optical axis direction, an image sensor 900 converting an optical signal into an electric signal, a substrate 910 on which the image sensor 900 is mounted, and the like. In addition, the camera module 16 may further include the gap maintaining member 500 according to the example embodiment described above.

The first lens barrel 100 may have a substantially truncated conical shape. However, a shape of the first lens barrel 100 is not limited to the truncated conical shape. For example, the first lens barrel 100 may have another shape within a range in which the first lens barrel 100 may accommodate one or more lenses therein. The first lens barrel 100 may have a shape whose one end and the other end have different sizes. For example, an outer diameter BED1 of the one end (object side) of the first lens barrel 100 may be smaller than an outer diameter BXD1 of the other end (image side, image sensor side) of the first lens barrel 100. In addition, the outer diameter BED1 of the one end of the first lens barrel 100 may be smaller than an inner diameter BXTD1 of the other end of the first lens barrel 100.

The first lens barrel 100 may be configured to accommodate one or more of lens groups constituting an optical system of the camera module 16 therein. For example, the first lens barrel 100 may accommodate a first lens group 300 therein. The first lens group 300 may be disposed closer to the object side than the other lens group. For example, the first lens group 300 may include a first lens disposed closest to the object side. The first lens group 300 may include a plurality of lenses. For example, the first lens group 300 may include five or more lenses. However, the number of lenses constituting the first lens group 300 is not limited to five. For example, the first lens group 300 may also include six or more lenses.

The first lens barrel 100 may be configured to accommodate the plurality of lenses therein. For example, an internal space 102 of the first lens barrel 100 may be formed to be elongated in an optical axis (C) direction. The first lens barrel 100 may align positions of the lenses accommodated in the internal space 102 with each other. For example, step portions 130 for aligning the lenses accommodated in the internal space 102 with each other may be formed in the internal space 102 of the first lens barrel 100. The step portions 130 may be formed according to sizes and the number of lenses accommodated in the first lens barrel 100. For example, when the first lens group 300 accommodated in the first lens barrel 100 includes six lenses, six step portions 130 may be formed in the internal space 102. However, the number of step portions 130 formed in the internal space 102 is not limited to the number of lenses accommodated in the first lens barrel 100. For example, the step portions 130 of the internal space 102 may be formed by the sum of the numbers of lenses and gap maintaining members accommodated in the first lens barrel 100. In detail, when five lenses and two gap maintaining members are accommodated in the first lens barrel 100, seven step portions 130 may be formed in the internal space 102.

The step portion 130 may become wider from the one side of the first lens barrel 100 toward the other side thereof. For example, the step portion 130 may become wider from the one side (object side) of the first lens barrel 100 toward the other side (image side, image sensor side) thereof.

The first lens barrel 100 may include a component for preventing separation of the lenses. For example, the first lens barrel 100 may include a first support portion 110 for preventing the lenses accommodated in the first lens barrel 100 from being separated toward the one side (object side) of the first lens barrel 100. The first support portion 110 may be configured to be in contact with a lens 310 located at the forwardmost position of the first lens group 300. For example, the first support portion 110 may have a shape of a stepped jaw or a protrusion in contact with a flange portion of the lens 310. The first support portion 110 may be formed at a front end (object side) of the first lens barrel 100. In detail, all the lenses accommodated in the first lens barrel 100 may be sequentially arranged behind (on the image side of) the first support portion 110. The first support portion 110 may be configured to prevent separation of the forwardmost (first) lens 310 described above. For example, the first support portion 110 may contact the flange portion of the first lens 310 to prevent separation of the first lens 310. The first support portion 110 may be configured to align a position of the forwardmost lens 310 described above. For example, the first support portion 110 may be in contact with an edge of the forwardmost lens 310 to align the position of the first lens 310.

The first support portion 110 may form an opening for enabling incidence of light. A size BD1 of the opening formed by the first support portion 110 may be substantially the same as an effective diameter ED1 of the forwardmost lens (the lens closest to the object side) of the first lens group 300. The first support portion 110 may implement a wide angle of view of the camera module 16. For example, one surface 112 of the first support portion 110 may be inclined to facilitate the incidence of the light.

The first lens barrel 100 may include a component for coupling the first lens barrel 100 to the second lens barrel 200. For example, a groove 120 in which a screw thread 122 is formed may be formed at the other end of the first lens barrel 100. The groove 120 may be formed continuously in a circumferential direction of the first lens barrel 100.

The second lens barrel 200 may have a substantially cylindrical shape. However, a shape of the second lens barrel 200 is not limited to the cylindrical shape. For example, the second lens barrel 200 may have another shape within a range in which the second lens barrel 200 may accommodate one or more lenses therein. The second lens barrel 200 may have a shape whose one end and other end have substantially the same size. For example, an outer diameter BED2 of the one end (object side) of the second lens barrel 200 may be substantially the same as an outer diameter BXD2 of the other end (image side: image sensor side) of the second lens barrel 200. The second lens barrel 200 may be configured to accommodate a lens larger than the lens accommodated in the first lens barrel 100 therein. For example, a maximum inner diameter or an inner diameter BETD2 of one end of the second lens barrel 200 may be larger than the inner diameter BXTD1 of the other end of the first lens barrel 100.

The second lens barrel 200 may be configured to accommodate other of the lens groups constituting the optical system of the camera module 16 therein. For example, the second lens barrel 200 may accommodate a second lens group 400 therein. The second lens group 400 may be disposed closer to the image side than the first lens group 300 is. For example, the second lens group 400 may include a lens disposed closest to the image side. The second lens group 400 may include one or more lenses. For example, the second lens group 400 may include one lens. However, the number of lenses constituting the second lens group 400 is not limited to one. For example, the second lens group 400 may also include two or more lenses. The second lens group 400 may include lenses substantially larger than those of the first lens group 300. For example, a maximum diameter of the lens constituting the second lens group 400 may be larger than a maximum diameter of the lens constituting the first lens group 300.

The second lens barrel 200 may include a component for preventing separation of the lens. For example, the second lens barrel 200 may include a second support portion 210 for preventing the lens accommodated in the second lens barrel 200 from being separated toward one side (image side) of the second lens barrel 200. The second support portion 210 may protrude toward an internal space 202 of the second lens barrel 200. The second support portion 210 may be formed at a rear end (image side) of the second lens barrel 200. In detail, all the lenses accommodated in the second lens barrel 200 may be sequentially arranged in front of (on the object side of) the second support portion 210. The second support portion 210 may be in contact with a rearmost lens 410 of the second lens group 400. For example, the second support portion 210 may be in contact with a flange portion of the rearmost lens 410 to prevent the rearmost lens 410 from being separated toward the image side and align a position of the rearmost lens 410. The second support portion 210 may be configured to prevent a flare phenomenon. For example, an inner peripheral surface of the second support portion 210 may form a predetermined angle with respect to the optical axis C to alleviate the flare phenomenon that may be caused by the rearmost lens 410.

The second lens barrel 200 may include a component for coupling the second lens barrel 200 to the first lens barrel 100. For example, a protrusion 220 in which a screw thread 222 is formed may be formed at one end of the second lens barrel 200. The protrusion 220 may be formed continuously in a circumferential direction of the second lens barrel 200.

The first lens barrel 100 and the second lens barrel 200 may be coupled to each other by screwing between the groove 120 and the protrusion 220. Therefore, the first lens barrel 100 and the second lens barrel 200 may not be separated from each other by an external impact.

In the camera module 16 including the components as described above, a phenomenon in which the lenses are separated due to an external impact may be prevented. For example, in the camera module 16, a phenomenon in which one or more lenses are separated toward the object side or the image side may be suppressed through the first support portion 110 of the first lens barrel 100 and the second support portion 210 of the second lens barrel 200. In addition, in the camera module 16, phenomena such as lifting, shaking, and rattling of the lenses accommodated in the first lens barrel 100 and the second lens barrel 200 may be suppressed through strong coupling between the first lens barrel 100 and the second lens barrel 200. Therefore, the camera module 16 according to the present example embodiment may improve image capturing quality through the optical system accommodated in the lens barrels 100 and 200.

Figure 7:
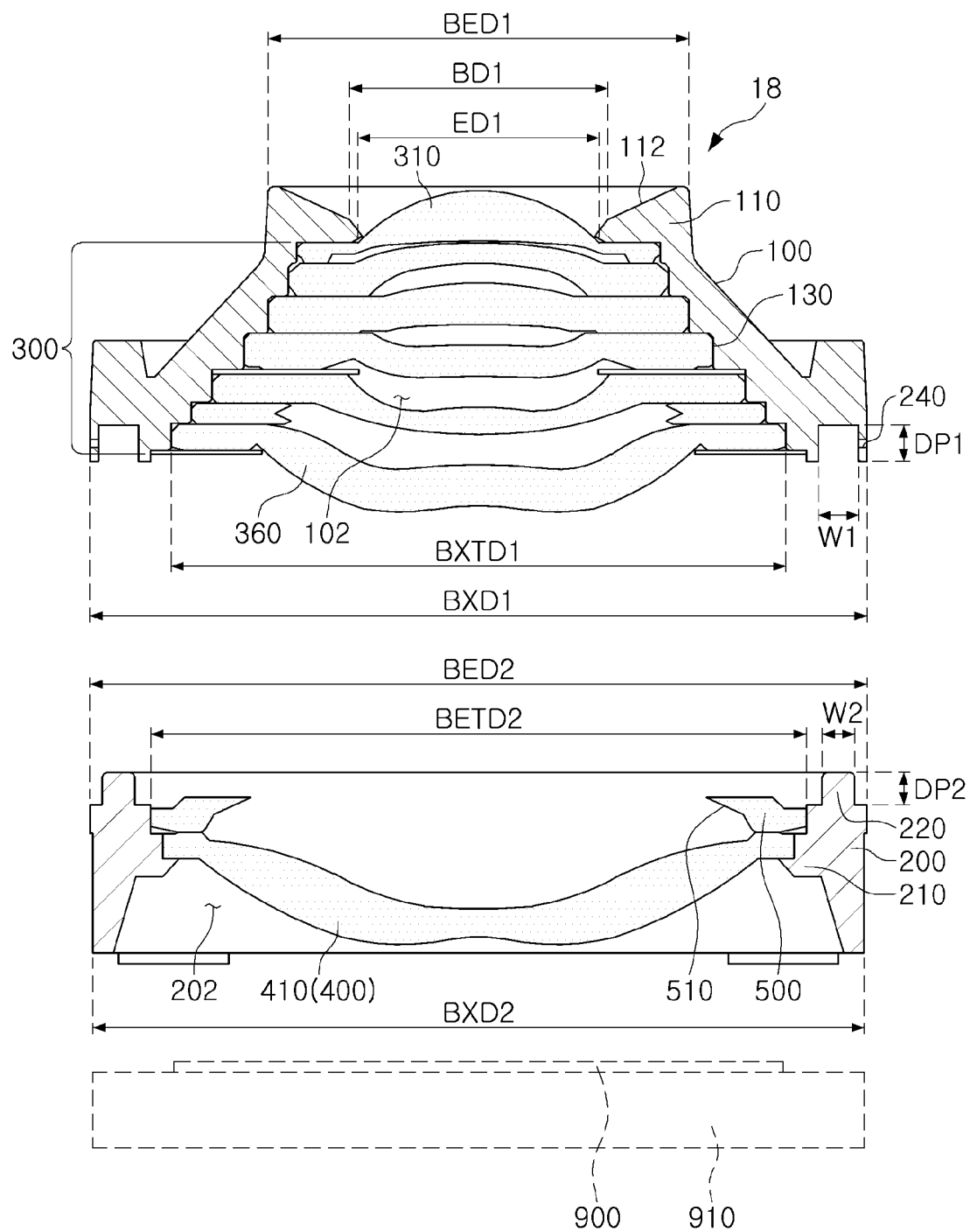
FIG. 7 is an exploded cross-sectional view of a camera module according to another example embodiment.
Figure 8:
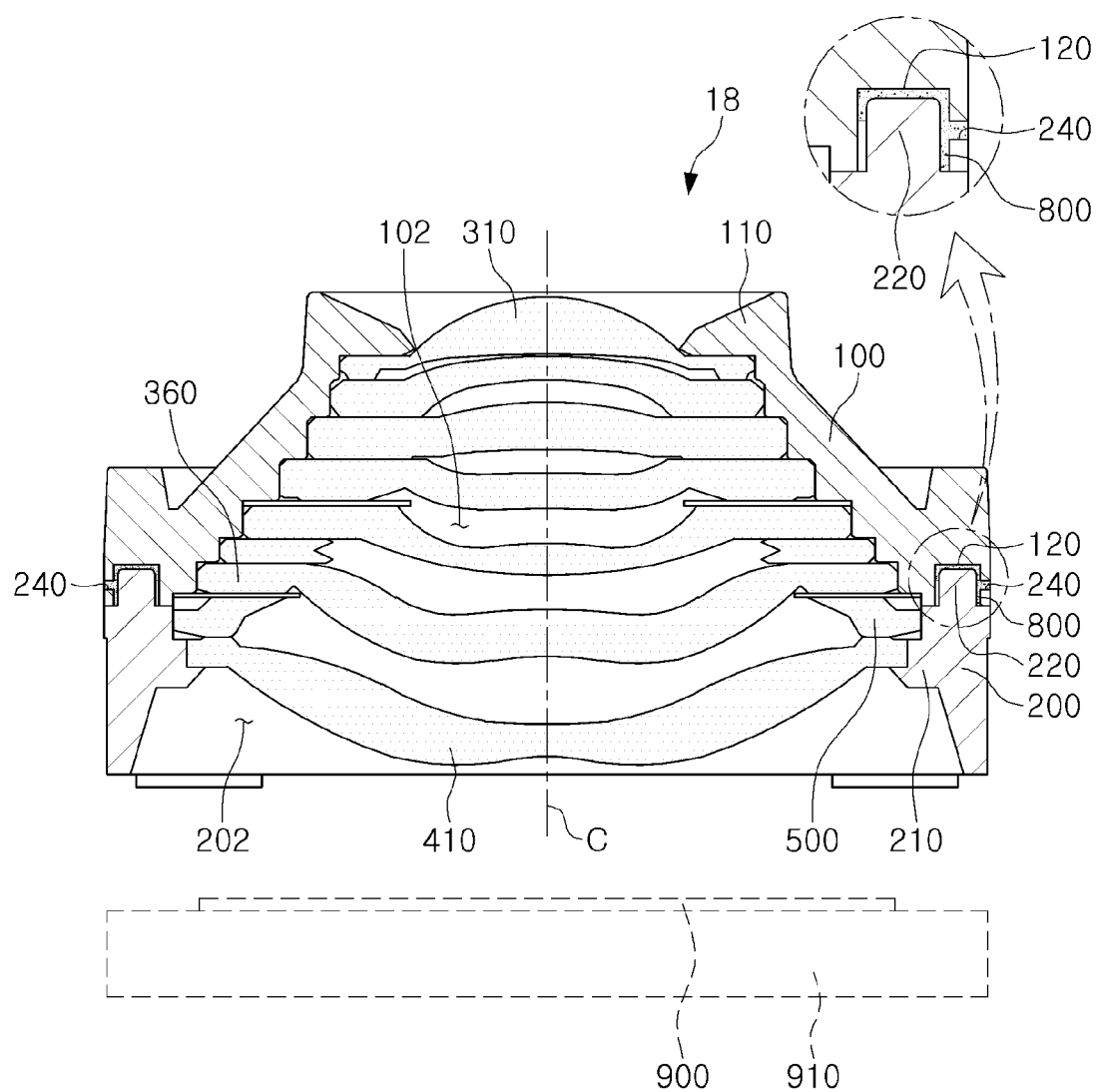
FIG. 8 is an assembled cross-sectional view of the camera module illustrated in FIG. 7.

A camera module according to another example embodiment in the present disclosure will be described with reference to FIGS. 7 and 8.

The camera module 18 according to the present embodiment may include a first lens barrel 100, a second lens barrel 200, and a gap maintaining member 500. However, components of the camera module 18 are not limited to the first lens barrel 100, the second lens barrel 200, and the gap maintaining member 500. For example, the camera module 18 may further include a driving unit driving the lens barrels 100 and 200 in an optical axis direction or in a direction intersecting with the optical axis direction, an image sensor 900 converting an optical signal into an electric signal, a substrate 910 on which the image sensor 900 is mounted, and the like.

The first lens barrel 100 may have a substantially truncated conical shape. However, a shape of the first lens barrel 100 is not limited to the truncated conical shape. For example, the first lens barrel 100 may have another shape within a range in which the first lens barrel 100 may accommodate one or more lenses therein. The first lens barrel 100 may have a shape whose one end and the other end have different sizes. For example, an outer diameter BED1 of one end (object side) of the first lens barrel 100 may be smaller than an outer diameter BXD1 of the other end (image side, image sensor side) of the first lens barrel 100. In addition, the outer diameter BED1 of one end of the first lens barrel 100 may be smaller than an inner diameter BXTD1 of the other end of the first lens barrel 100.

The first lens barrel 100 may be configured to accommodate one or more lens groups constituting an optical system of the camera module 18 therein. For example, the first lens barrel 100 may accommodate a first lens group 300 therein. The first lens group 300 may be disposed closer to the object side than the other lens group. For example, the first lens group 300 may include a first lens disposed closest to the object side. The first lens group 300 may include a plurality of lenses. For example, the first lens group 300 may include five or more lenses. However, the number of lenses constituting the first lens group 300 is not limited to five. For example, the first lens group 300 may also include six or more lenses.

The first lens barrel 100 may be configured to accommodate the plurality of lenses therein. For example, an internal space 102 of the first lens barrel 100 may be formed to be elongated in an optical axis (C) direction. The first lens barrel 100 may align positions of the lenses accommodated in the internal space 102 with each other. For example, step portions 130 for aligning the lenses accommodated in the internal space 102 with each other may be formed in the internal space 102 of the first lens barrel 100. The step portions 130 may be formed according to sizes and the number of lenses accommodated in the first lens barrel 100. For example, when the first lens group 300 accommodated in the first lens barrel 100 includes six lenses, six step portions 130 may be formed in the internal space 102. However, the number of step portions 130 formed in the internal space 102 is not limited to the number of lenses accommodated in the first lens barrel 100. For example, the step portions 130 of the internal space 102 may be formed by the sum of the numbers of lenses and gap maintaining members accommodated in the first lens barrel 100. In detail, when five lenses and two gap maintaining members are accommodated in the first lens barrel 100, seven step portions 130 may be formed in the internal space 102.

The step portion 130 may become wider from one side of the first lens barrel 100 toward the other side thereof. For example, the step portion 130 may become wider from one side (object side) of the first lens barrel 100 toward the other side (image side: image sensor side) thereof.

The first lens barrel 100 may include a component for preventing separation of the lenses. For example, the first lens barrel 100 may include a first support portion 110 for preventing the lenses accommodated in the first lens barrel 100 from being separated toward one side (object side) of the first lens barrel 100. The first support portion 110 may be configured to be in contact with a lens 310 located at the forwardmost position of the first lens group 300. For example, the first support portion 110 may have a shape of a stepped jaw or a protrusion in contact with a flange portion of the lens 310. The first support portion 110 may be formed at a front end (object side) of the first lens barrel 100. In detail, all the lenses accommodated in the first lens barrel 100 may be sequentially arranged behind (on the image side of) the first support portion 110. The first support portion 110 may be configured to prevent separation of the forwardmost lens 310 described above. For example, the first support portion 110 may contact the flange portion of the first lens 310 to prevent separation of the first lens 310. The first support portion 110 may be configured to align a position of the forwardmost lens 310 described above. For example, the first support portion 110 may be in contact with an edge of the forwardmost lens 310 to align the position of the first lens 310.

The first support portion 110 may form an opening for enabling incidence of light. A size BD1 of the opening formed by the first support portion 110 may be substantially the same as an effective diameter ED1 of the forwardmost lens (the lens closest to the object side) of the first lens group 300. The first support portion 110 may implement a wide angle of view of the camera module 18. For example, one surface 112 of the first support portion 110 may be inclined to facilitate the incidence of the light.

The first lens barrel 100 may include a component for coupling the first lens barrel 100 to the second lens barrel 200. For example, a groove 120 may be formed at the other end of the first lens barrel 100. The groove 120 may be formed continuously or discontinuously in a circumferential direction of the first lens barrel 100. For example, the groove 120 may be formed in a circular shape around an optical axis C or may be formed at a predetermined interval around the optical axis C. The groove 120 may be formed to have a predetermined size. For example, a width W1 and a depth DP1 of the groove 120 may be substantially the same, respectively, as a thickness W2 and a height DP2 of a protrusion 220 fitted into the groove 120.

The first lens barrel 100 may further include a component for firmly coupling the first lens barrel 100 to the second lens barrel 200. For example, a hole 240 connected to the groove 120 may be formed in an outer peripheral surface of the first lens barrel 100. The hole 240 may be formed to have a significant size. For example, the hole 240 may be formed to have a size sufficient to accommodate the adhesive 800. In addition, the hole 240 may be used as a passage for filling the adhesive 800 in the groove 120. The adhesive 800 introduced through the hole 240 may be filled in a space formed between the groove 120 and the protrusion 220, as illustrated in FIG. 8.

The second lens barrel 200 may have a substantially cylindrical shape. However, a shape of the second lens barrel 200 is not limited to the cylindrical shape. For example, the second lens barrel 200 may have another shape within a range in which the second lens barrel 200 may accommodate one or more lenses therein. The second lens barrel 200 may have a shape whose one end and the other end have substantially the same size. For example, an outer diameter BED2 of one end (object side) of the second lens barrel 200 may be substantially the same as an outer diameter BXD2 of the other end (image side, image sensor side) of the second lens barrel 200. The second lens barrel 200 may be configured to accommodate a lens larger than the lens accommodated in the first lens barrel 100 therein. For example, a maximum inner diameter or an inner diameter BETD2 of one end of the second lens barrel 200 may be larger than the inner diameter BXTD1 of the other end of the first lens barrel 100.

The second lens barrel 200 may be configured to accommodate other of the lens groups constituting the optical system of the camera module 18 therein. For example, the second lens barrel 200 may accommodate a second lens group 400 therein. The second lens group 400 may be disposed closer to the image side than the first lens group 300. For example, the second lens group 400 may include a lens disposed closest to the image side. The second lens group 400 may include one or more lenses. For example, the second lens group 400 may include one lens. However, the number of lenses constituting the second lens group 400 is not limited to one. For example, the second lens group 400 may also include two or more lenses. The second lens group 400 may include lenses substantially larger than those of the first lens group 300. For example, a maximum diameter of the lens constituting the second lens group 400 may be larger than a maximum diameter of the lens constituting the first lens group 300.

The second lens barrel 200 may include a component for preventing separation of the lens. For example, the second lens barrel 200 may include a second support portion 210 for preventing the lens accommodated in the second lens barrel 200 from being separated toward one side (image side) of the second lens barrel 200. The second support portion 210 may protrude toward an internal space 202 of the second lens barrel 200. The second support portion 210 may be formed at a rear end (image side) of the second lens barrel 200. In detail, all the lenses accommodated in the second lens barrel 200 may be sequentially arranged in front of (on the object side of) the second support portion 210. The second support portion 210 may be in contact with a rearmost lens 410 of the second lens group 400. For example, the second support portion 210 may be in contact with a flange portion of the rearmost lens 410 to prevent the rearmost lens 410 from being separated toward the image side and align a position of the rearmost lens 410. The second support portion 210 may be configured to prevent a flare phenomenon. For example, an inner peripheral surface of the second support portion 210 may form a predetermined angle with respect to the optical axis C to alleviate the flare phenomenon that may be caused by the rearmost lens 410.

The second lens barrel 200 may include a component for coupling the second lens barrel 200 to the first lens barrel 100. For example, the protrusion 220 may be formed at one end of the second lens barrel 200. The protrusion 220 may be formed continuously or discontinuously in a circumferential direction of the second lens barrel 200. For example, the protrusion 220 may be formed in a circular shape around the optical axis C or may be formed at a predetermined interval around the optical axis C. The protrusion 220 may be formed to have a predetermined size. For example, the thickness W2 and the height DP2 of the protrusion 220 may be substantially the same as the width W1 and the depth DP1 of the groove 120, respectively.

The gap maintaining member 500 may be disposed between the first lens barrel 100 and the second lens barrel 200. For example, the gap maintaining member 500 may be disposed between a lens 360 disposed at the rearmost position of the first lens barrel 100 and the lens 410 disposed at the forwardmost position of the second lens barrel 200. The gap maintaining member 500 may serve to maintain a gap between the lenses at a size according to an optical design. For example, a gap between the lens 360 and the lens 410 may be adjusted by changing a thickness of the gap maintaining member 500. The gap maintaining member 500 may be formed to have a predetermined size. For example, a maximum diameter of the gap maintaining member 500 may be larger than a maximum diameter of the lens 410 disposed at the forwardmost position of the second lens barrel 200. However, the maximum diameter of the gap maintaining member 500 is not necessarily larger than the maximum diameter of the lens 410. For example, the maximum diameter of the gap maintaining member 500 may be smaller than the maximum diameter of the lens 410.

The gap maintaining member 500 may serve to alleviate a flare phenomenon. For example, an inner peripheral surface 510 of the gap maintaining member 500 may form a predetermined angle with respect to the optical axis C to alleviate the flare phenomenon that may be caused between the lens 360 and the lens 410. The gap maintaining member 500 may be configured to align optical axes of the lens 360 and the lens 410 with each other. For example, the gap maintaining member 500 and the lenses 360 and 410 may be configured to engage with each other through a protrusion, a groove, or other coupling structures, so that relative positions of the gap maintaining member 500 and the lenses 360 and 410 may be aligned with each other through a coupling contact.

The first lens barrel 100 and the second lens barrel 200 may be preliminarily coupled to each other by the protrusion 220 fitted into the groove 120, and then permanently and firmly coupled to each other by the adhesive 800 injected through the hole 240. In detail, a coupled position between the first lens barrel 100 and the second lens barrel 200 may be adjusted in a state in which the first lens barrel 100 and the second lens barrel 200 are temporarily coupled to each other by the groove 120 and the protrusion 220. Thereafter, when the coupled position between the first lens barrel 100 and the second lens barrel 200 is aligned at an error level, the first lens barrel 100 and the second lens barrel 200 may be firmly coupled to each other through the adhesive 800 injected through the hole 240.

In the camera module 18 including the components as described above, a phenomenon in which the lenses are separated due to an external impact may be prevented. For example, in the camera module 18, a phenomenon in which one or more lenses are separated toward the object side or the image side may be suppressed through the first support portion 110 of the first lens barrel 100 and the second support portion 210 of the second lens barrel 200. In addition, in the camera module 18, phenomena such as lifting, shaking, and rattling of the lenses accommodated in the first lens barrel 100 and the second lens barrel 200 may be suppressed through strong coupling between the first lens barrel 100 and the second lens barrel 200. Therefore, the camera module 18 according to the present example embodiment may improve image capturing quality through the optical system accommodated in the lens barrels 100 and 200.

In addition, in the camera module 18 according to the present example embodiment, positions of the lens barrels 100 and 200 may be aligned with each other even after the lens barrels 100 and 200 are attached to each other, and high resolution may thus be implemented.

Figure 9:
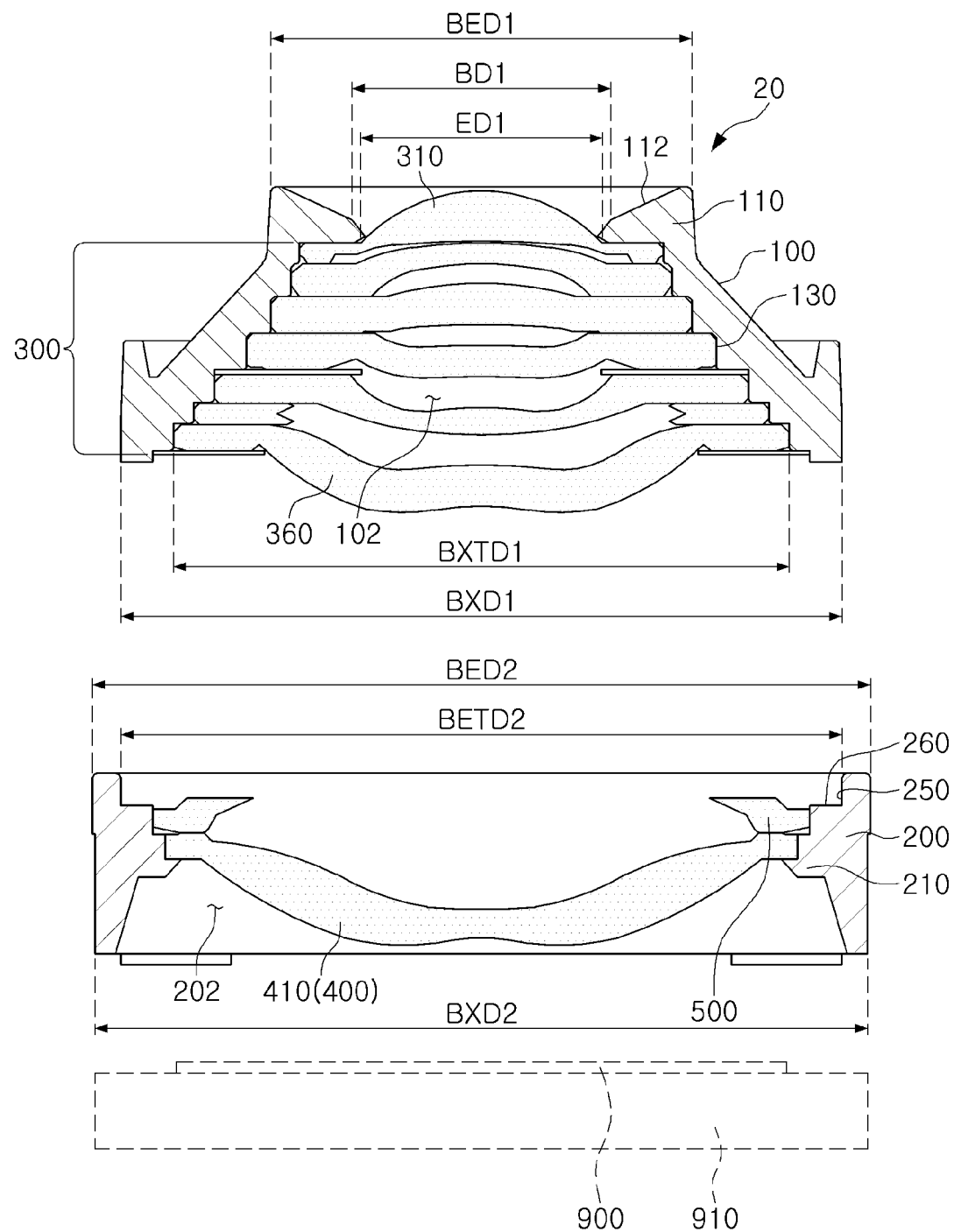
FIG. 9 is an exploded cross-sectional view of a camera module according to another example embodiment.
Figure 10:
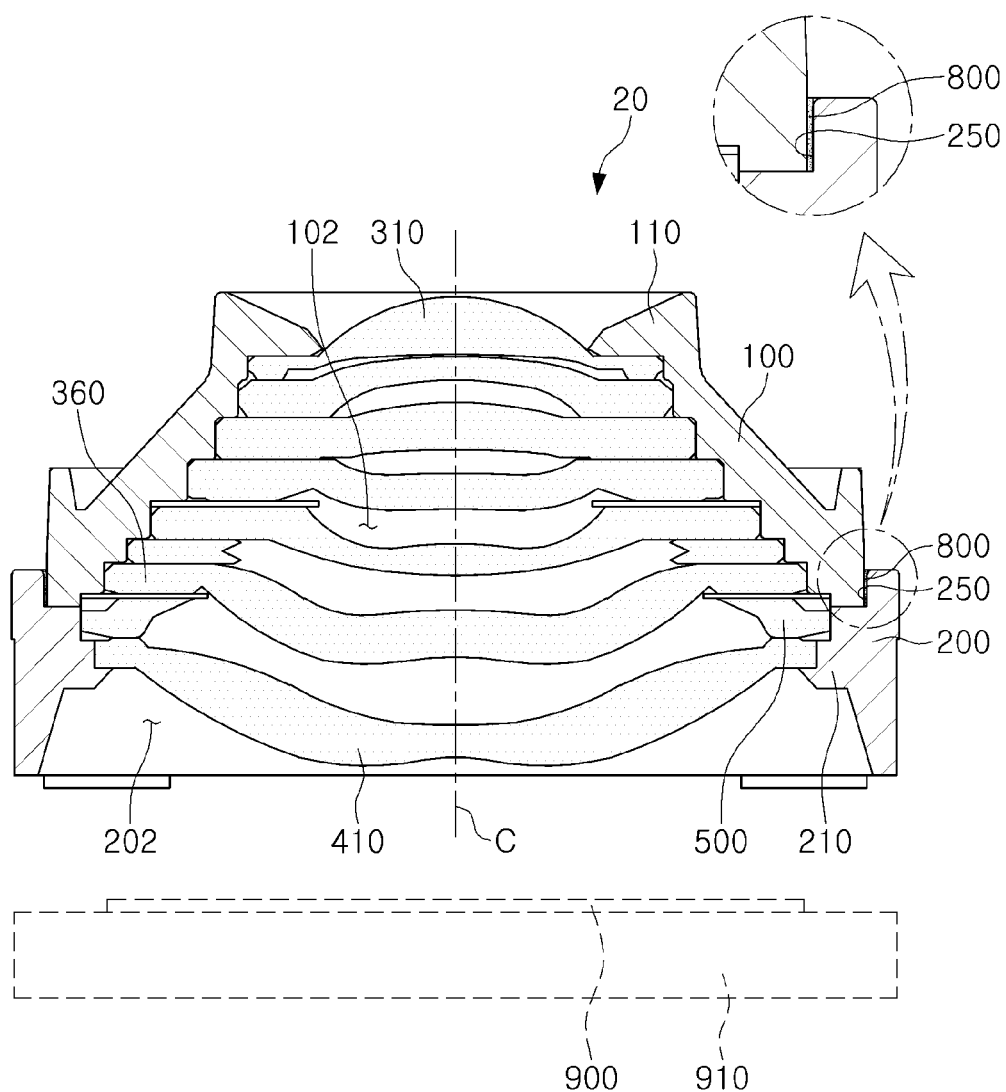
FIG. 10 is an assembled cross-sectional view of the camera module illustrated in FIG. 9.

A camera module according to another example embodiment in the present disclosure will be described with reference to FIGS. 9 and 10.

The camera module 20 according to the present embodiment may include a first lens barrel 100, a second lens barrel 200, and a gap maintaining member 500. However, components of the camera module 20 are not limited to the first lens barrel 100, the second lens barrel 200, and the gap maintaining member 500. For example, the camera module 20 may further include a driving unit driving the lens barrels 100 and 200 in an optical axis direction or in a direction intersecting with the optical axis direction, an image sensor 900 converting an optical signal into an electric signal, a substrate 910 on which the image sensor 900 is mounted, and the like.

The first lens barrel 100 may have a substantially truncated conical shape. However, a shape of the first lens barrel 100 is not limited to the truncated conical shape. For example, the first lens barrel 100 may have another shape within a range in which the first lens barrel 100 may accommodate one or more lenses therein. The first lens barrel 100 may have a shape whose one end and the other end have different sizes. For example, an outer diameter BED1 of one end (object side) of the first lens barrel 100 may be smaller than an outer diameter BXD1 of the other end (image side, image sensor side) of the first lens barrel 100. In addition, the outer diameter BED1 of one end of the first lens barrel 100 may be smaller than an inner diameter BXTD1 of the other end of the first lens barrel 100.

The first lens barrel 100 may be configured to accommodate one or more lens groups constituting an optical system of the camera module 20 therein. For example, the first lens barrel 100 may accommodate a first lens group 300 therein. The first lens group 300 may be disposed closer to the object side than the other lens group. For example, the first lens group 300 may include a first lens disposed closest to the object side. The first lens group 300 may include a plurality of lenses. For example, the first lens group 300 may include five or more lenses. However, the number of lenses constituting the first lens group 300 is not limited to five. For example, the first lens group 300 may also include six or more lenses.

The first lens barrel 100 may be configured to accommodate the plurality of lenses therein. For example, an internal space 102 of the first lens barrel 100 may be formed to be elongated in an optical axis (C) direction. The first lens barrel 100 may align positions of the lenses accommodated in the internal space 102 with each other. For example, step portions 130 for aligning the lenses accommodated in the internal space 102 with each other may be formed in the internal space 102 of the first lens barrel 100. The step portions 130 may be formed according to sizes and the number of lenses accommodated in the first lens barrel 100. For example, when the first lens group 300 accommodated in the first lens barrel 100 includes six lenses, six step portions 130 may be formed in the internal space 102. However, the number of step portions 130 formed in the internal space 102 is not limited to the number of lenses accommodated in the first lens barrel 100. For example, the step portions 130 of the internal space 102 may be formed by the sum of the numbers of lenses and gap maintaining members accommodated in the first lens barrel 100. In detail, when five lenses and two gap maintaining members are accommodated in the first lens barrel 100, seven step portions 130 may be formed in the internal space 102.

The step portion 130 may become wider from one side of the first lens barrel 100 toward the other side thereof. For example, the step portion 130 may become wider from one side (object side) of the first lens barrel 100 toward the other side (image side, image sensor side) thereof.

The first lens barrel 100 may include a component for preventing separation of the lenses. For example, the first lens barrel 100 may include a first support portion 110 for preventing the lenses accommodated in the first lens barrel 100 from being separated toward one side (object side) of the first lens barrel 100. The first support portion 110 may be configured to be in contact with a lens 310 located at the forwardmost position of the first lens group 300. For example, the first support portion 110 may have a shape of a stepped jaw or a protrusion in contact with a flange portion of the lens 310. The first support portion 110 may be formed at a front end (object side) of the first lens barrel 100. In detail, all the lenses accommodated in the first lens barrel 100 may be sequentially arranged behind (on the image side of) the first support portion 110. The first support portion 110 may be configured to prevent separation of the forwardmost lens 310 described above. For example, the first support portion 110 may contact the flange portion of the first lens 310 to prevent separation of the first lens 310. The first support portion 110 may be configured to align a position of the forwardmost lens 310 described above. For example, the first support portion 110 may be in contact with an edge of the forwardmost lens 310 to align the position of the first lens 310.

The first support portion 110 may form an opening for enabling incidence of light. A size BD1 of the opening formed by the first support portion 110 may be substantially the same as an effective diameter ED1 of the forwardmost lens of the first lens group 300. The first support portion 110 may implement a wide angle of view of the camera module 20. For example, one surface 112 of the first support portion 110 may be inclined to facilitate the incidence of the light.

The second lens barrel 200 may have a substantially cylindrical shape. However, a shape of the second lens barrel 200 is not limited to the cylindrical shape. For example, the second lens barrel 200 may have another shape within a range in which the second lens barrel 200 may accommodate one or more lenses therein. The second lens barrel 200 may have a shape whose one end and other end have substantially the same size. For example, an outer diameter BED2 of one end (object side) of the second lens barrel 200 may be substantially the same as an outer diameter BXD2 of the other end (image side, image sensor side) of the second lens barrel 200. The second lens barrel 200 may be configured to accommodate a lens larger than the lens accommodated in the first lens barrel 100 therein. For example, an inner diameter BETD2 of one end of the second lens barrel 200 may be larger than the inner diameter BXTD1 of the other end of the first lens barrel 100.

The second lens barrel 200 may be configured to accommodate the other of the lens groups constituting the optical system of the camera module 20 therein. For example, the second lens barrel 200 may accommodate a second lens group 400 therein. The second lens group 400 may be disposed closer to the image side than the first lens group 300. For example, the second lens group 400 may include a lens disposed closest to the image side. The second lens group 400 may include one or more lenses. For example, the second lens group 400 may include one lens. However, the number of lenses constituting the second lens group 400 is not limited to one. For example, the second lens group 400 may also include two or more lenses. The second lens group 400 may include lenses substantially larger than those of the first lens group 300. For example, a maximum diameter of the lens constituting the second lens group 400 may be larger than a maximum diameter of the lens constituting the first lens group 300.

The second lens barrel 200 may include a component for preventing separation of the lens. For example, the second lens barrel 200 may include a second support portion 210 for preventing the lens accommodated in the second lens barrel 200 from being separated toward one side (image side) of the second lens barrel 200. The second support portion 210 may protrude toward an internal space 202 of the second lens barrel 200. The second support portion 210 may be formed continuously or may be formed at a predetermined interval, along an inner peripheral surface of the second lens barrel 200. The second support portion 210 may be formed at a rear end (image side) of the second lens barrel 200. In detail, all the lenses accommodated in the second lens barrel 200 may be sequentially arranged in front of (on the object side of) the second support portion 210. The second support portion 210 may be in contact with a rearmost lens 410 of the second lens group 400. For example, the second support portion 210 may be in contact with a flange portion of the rearmost lens 410 to prevent the rearmost lens 410 from being separated toward the image side and align a position of the rearmost lens 410. The second support portion 210 may be configured to prevent a flare phenomenon. For example, an inner peripheral surface of the second support portion 210 may form a predetermined angle with respect to the optical axis C to alleviate the flare phenomenon that may be caused by the rearmost lens 410.

The second lens barrel 200 may include a component for coupling the second lens barrel 200 to the first lens barrel 100. For example, an accommodation portion 250 for accommodating a rear end of the first lens barrel 100 therein and a stepped jaw 260 in contact with the rear end of the first lens barrel 100 may be formed at one side of the second lens barrel 200. The accommodation portion 250 may be formed to have a predetermined size. For example, an inner diameter BETD2 of the accommodation portion 250 may be larger than a maximum diameter of the first lens barrel 100 or an outer diameter BXD1 of the other end of the first lens barrel 100. A groove or a space into which an adhesive may be injected and filled may be formed in the first lens barrel 100 or the second lens barrel 200. For example, a space into which an adhesive 800 may be injected may be formed between an outer peripheral surface of the first lens barrel 100 and the accommodation portion 250 of the second lens barrel 200.

The gap maintaining member 500 may be disposed between the first lens barrel 100 and the second lens barrel 200. For example, the gap maintaining member 500 may be disposed between a lens 360 disposed at the rearmost position of the first lens barrel 100 and the lens 410 disposed at the forwardmost position of the second lens barrel 200. The gap maintaining member 500 may serve to maintain a gap between the lenses at a size according to an optical design. For example, a gap between the lens 360 and the lens 410 may be adjusted by changing a thickness of the gap maintaining member 500. The gap maintaining member 500 may be formed to have a predetermined size. For example, a maximum diameter of the gap maintaining member 500 may be larger than a maximum diameter of the lens 410 disposed at the forwardmost position of the second lens barrel 200. However, the maximum diameter of the gap maintaining member 500 is not necessarily larger than the maximum diameter of the lens 410. For example, the maximum diameter of the gap maintaining member 500 may be smaller than the maximum diameter of the lens 410.

The gap maintaining member 500 may serve to alleviate a flare phenomenon. For example, an inner peripheral surface 510 of the gap maintaining member 500 may form a predetermined angle with respect to the optical axis C to alleviate the flare phenomenon that may be caused between the lens 360 and the lens 410. The gap maintaining member 500 may be configured to align optical axes of the lens 360 and the lens 410 with each other. For example, the gap maintaining member 500 and the lenses 360 and 410 may be configured to engage with each other through a protrusion, a groove, or other coupling structures, so that relative positions of the gap maintaining member 500 and the lenses 360 and 410 may be aligned with each other through a coupling contact.

In the camera module 20 including the components as described above, a phenomenon in which the lenses are separated due to an external impact may be prevented. For example, in the camera module 20, a phenomenon in which one or more lenses are separated toward the object side or the image side may be suppressed through the first support portion 110 of the first lens barrel 100 and the second support portion 210 of the second lens barrel 200. In addition, in the camera module 20, phenomena such as lifting, shaking, and rattling of the lenses accommodated in the first lens barrel 100 and the second lens barrel 200 may be suppressed through firm coupling between the first lens barrel 100 and the second lens barrel 200. Therefore, the camera module 20 according to the present example embodiment may improve image capturing quality through the optical system accommodated in the lens barrels 100 and 200.

As set forth above, according to one or more example embodiments of the present disclosure, a phenomenon in which a lens is separated from a lens barrel may be prevented.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a first lens barrel comprising a first support portion supporting a lens accommodated in the first lens barrel on an object side of the first lens barrel; and a second lens barrel comprising a second support portion supporting a rearmost lens accommodated in the second lens barrel, the second support portion being formed integrally with the second lens barrel and protruding toward an internal space of the second lens barrel and supporting an image-side surface of the rearmost lens,
wherein the first lens barrel and the second lens barrel are configured to be adjustably coupled to each other in an optical axis direction by press-fitting a protrusion and a groove,
wherein a gap is provided between a top surface of the protrusion and a bottom surface of the groove, and
wherein the groove is formed in a lower portion of the first lens barrel, and the protrusion is formed on an upper portion of the second lens barrel.

2. The camera module of claim 1, further comprising:
a first lens group disposed in the first lens barrel; and
a second lens group disposed in the second lens barrel.

3. The camera module of claim 2, wherein the first lens group comprises a plurality of lenses.

4. The camera module of claim 2, wherein a maximum diameter of a lens constituting the first lens group is smaller than that of a lens constituting the second lens group.

5. The camera module of claim 2, wherein the first lens barrel comprises a step portion for supporting a lens of the first lens group in a first accommodation space of the first lens barrel.

6. The camera module of claim 1, further comprising a gap maintaining member disposed between a first lens accommodated in the first lens barrel and a second lens accommodated in the second lens barrel when the first lens barrel and the second lens barrel are coupled to each other by the protrusion and the groove.

7. The camera module of claim 6, wherein a maximum diameter of the gap maintaining member is larger than that of the second lens.

8. The camera module of claim 1, wherein a space in which an adhesive is to be filled is located between the protrusion and the groove when the first lens barrel and the second lens barrel are coupled to each other by the protrusion and the groove.

9. The camera module of claim 1, wherein the protrusion and the groove comprise screw threads to mate to each other.

10. An electronic device comprising:
the camera module of claim 1 further comprising an image sensor configured to convert an optical signal incident through the lenses of the first and second lens barrels into an electric signal when the first lens barrel and the second lens barrel are coupled to each other by the protrusion and the groove; and
a surface installed with the camera module.

11. A camera module, comprising:
a first lens barrel comprising a first support portion supporting a lens accommodated in the first lens barrel on an object side of the first lens barrel; and
a second lens barrel comprising a second support portion supporting a rearmost lens accommodated in the second lens barrel on an image side of the second lens barrel, the second support portion being formed integrally with the second lens barrel and protruding toward an internal space of the second lens barrel and supporting an image-side surface of the rearmost lens,
wherein the first lens barrel is configured to be adjustably coupled to the second lens barrel in an optical axis direction, and is configured to be press-fitted into the second lens barrel,
wherein a maximum diameter of the first lens barrel is smaller than a maximum diameter of the second lens barrel,
wherein a gap is provided between an outer peripheral surface of the first lens barrel and an inner peripheral surface of the second lens barrel in a direction perpendicular to an optical axis,
wherein the first lens barrel is coupled to the second lens barrel by a groove that is formed in a lower portion of the first lens barrel, and a protrusion that is formed on an upper portion of the second lens barrel, and
wherein a gap is provided between a top surface of the protrusion and a bottom surface of the groove.

12. The camera module of claim 11, further comprising:
a first lens group disposed in the first lens barrel; and
a second lens group disposed in the second lens barrel.

13. The camera module of claim 12, wherein a maximum diameter of a lens constituting the first lens group is smaller than that of a lens constituting the second lens group.

14. The camera module of claim 11, further comprising a gap maintaining member disposed between a first lens accommodated in the first lens barrel and a second lens accommodated in the second lens barrel when the first lens barrel is fitted into the second lens barrel.

15. The camera module of claim 14, wherein an inner peripheral surface of the gap maintaining member comprises an inclination.

16. The camera module of claim 11, wherein the second support portion is in contact with a flange portion of the rearmost lens and comprises an inner peripheral surface that forms an angle with respect to an optical axis.

17. The camera module of claim 11, wherein a space in which an adhesive is applied is located between the outer peripheral surface of the first lens barrel and the inner peripheral surface of the second lens barrel when the first lens barrel is fitted into the second lens barrel.

18. An electronic device comprising:
the camera module of claim 11 further comprising an image sensor configured to convert an optical signal incident through the lenses of the first and second lens barrels into an electric signal when the first lens barrel is fitted into the second lens barrel; and
a surface installed with the camera module.

19. A camera module, comprising:
a first lens barrel comprising a first support portion disposed on an object side of the first lens barrel supporting a first lens accommodated in the first lens barrel;
a second lens barrel comprising a second support portion disposed on an image side of the second lens barrel supporting a second lens accommodated in the second lens barrel, the second support portion being formed integrally with the second lens barrel and protruding toward an internal space of the second lens barrel and supporting an image-side surface of the second lens;
a coupling component configured to adjustably couple the first lens barrel to the second lens barrel in an optical axis direction by press fitting the first lens barrel to the second lens barrel; and
an image sensor configured to convert an optical signal incident through the first and second lenses into an electric signal,
wherein the coupling component comprises a gap in at least one of an optical axis direction and a direction perpendicular to an optical axis,
wherein the first lens barrel is coupled to the second lens barrel by a groove that is formed in a lower portion of the first lens barrel, and a protrusion that is formed on an upper portion of the second lens barrel, and wherein a gap is provided between a top surface of the protrusion and a bottom surface of the groove.

20. An electronic device comprising:

the camera module of claim 19; and a surface installed with the camera module, wherein the coupling component comprises a protrusion on an object side of the second lens barrel coupling with a groove or an outer diameter of the image side of the first lens barrel.

* * * * *